United States Patent
Liao (10) Patent No.: US 11,366,349 B2
(45) Date of Patent: Jun. 21, 2022

(54) LIQUID CRYSTAL DISPLAY PANEL AND MANUFACTURING METHOD OF DISPLAY MODULE

(71) Applicant: TCL CHINA STAR OPTOELECTRONICS TECHNOLOGY CO., LTD., Shenzhen (CN)

(72) Inventor: Huihua Liao, Shenzhen (CN)

( * ) Notice: Subject to any disclaimer, the term of this patent is extended or adjusted under 35 U.S.C. 154(b) by 363 days.

(21) Appl. No.: 16/619,471

(22) PCT Filed: Nov. 15, 2019

(86) PCT No.: PCT/CN2019/118814
§ 371 (c)(1),
(2) Date: Dec. 5, 2019

(87) PCT Pub. No.: WO2021/082091
PCT Pub. Date: May 6, 2021

(65) Prior Publication Data
US 2021/0349345 A1    Nov. 11, 2021

(30) Foreign Application Priority Data

Oct. 29, 2019 (CN) .......................... 201911037018.8

(51) Int. Cl.
*G02F 1/1333* (2006.01)
*G02F 1/1335* (2006.01)

(52) U.S. Cl.
CPC .. *G02F 1/133351* (2013.01); *G02F 1/133354* (2021.01); *G02F 1/133528* (2013.01)

(58) Field of Classification Search
CPC ......... G02F 1/133351; G02F 1/133354; G02F 1/133528
See application file for complete search history.

(56) References Cited

U.S. PATENT DOCUMENTS

| | | | |
|---|---|---|---|
| 9,831,300 B2 * | 11/2017 | Bae | H01L 27/3276 |
| 2011/0006671 A1 * | 1/2011 | Kwon | H01L 51/56 |
| | | | 313/505 |
| 2017/0187934 A1 * | 6/2017 | Kwak | H04N 5/2251 |
| 2018/0019126 A1 * | 1/2018 | Park | H01L 31/182 |
| 2018/0356661 A1 * | 12/2018 | Lee | G02F 1/133345 |
| 2019/0299567 A1 | 10/2019 | Liu et al. | |
| 2020/0070285 A1 | 3/2020 | Kang et al. | |

FOREIGN PATENT DOCUMENTS

| | | |
|---|---|---|
| CN | 102844703 A | 12/2012 |
| CN | 107742476 A | 2/2018 |
| CN | 107871679 A | 4/2018 |

(Continued)

*Primary Examiner* — Mariceli Santiago (57) ABSTRACT

A liquid crystal display panel and a manufacturing method of a display module are provided. Cutting guide slots are formed on a transparent base of the liquid crystal display panel, and depths of the cutting guide slots are less than a thickness of the transparent base, which does not affect normal attachment of polarizers, so that after the polarizers are attached on the liquid crystal display panel, due to a presence of the cutting guide slots, strong laser energy is not required to realize cutting of the liquid crystal display panel, which improves cutting yield.

9 Claims, 6 Drawing Sheets

(56) References Cited

FOREIGN PATENT DOCUMENTS

| | | | |
|---|---|---|---|
| CN | 108538862 A | | 9/2018 |
| CN | 108646444 A | | 10/2018 |
| CN | 109031743 A | | 12/2018 |
| CN | 110335890 A | | 10/2019 |
| CN | 110480190 A | * | 11/2019 |
| JP | 2017100255 A | | 6/2017 |
| JP | 6578533 B1 | | 9/2019 |

* cited by examiner

FIG. 1 top view

B-B' sectional view

FIG. 2

FIG. 3 top view

C-C' sectional view

FIG. 4 top view

C-C' sectional view

LIQUID CRYSTAL DISPLAY PANEL AND MANUFACTURING METHOD OF DISPLAY MODULE

FIELD OF INVENTION

The present disclosure relates to the field of display, and particularly relates to a liquid crystal display panel and a manufacturing method of a display module.

BACKGROUND OF INVENTION

With development of technology, mobile phones with irregular notch screens, such as round corner screens, etc., have appeared. In order to ensure cutting accuracy, in the prior art, a laser cutting machine is used to perform a notch shaped cut on liquid crystal display panels and polarizers simultaneously to realize the irregular notch screens of the liquid crystal display panels.

In the prior art, after bonding the polarizers to the liquid crystal display panel, a laser cutting machine is used to cut the polarizers and the liquid crystal display panel simultaneously. Because it is necessary to cut the polarizers and the liquid crystal display panel simultaneously, and polarizers cause laser energy to be diffused, effective concentration of laser energy cannot be ensured, and cracks easily occur on a transparent base of the liquid crystal display panel, such as glass, etc., resulting in edge collapses and breakage.

The technical problem is that cracks occur due to laser energy being unable to effectively concentrate in the present cutting technology of notch screens.

SUMMARY OF INVENTION

The present disclosure provides a liquid crystal display and a manufacturing method of a display module to ease the technical problem of due to laser energy being unable effectively concentrated being presence in the present cutting technology of notch screens causing cracks.

In order to solve the problems mentioned above, the present disclosure provides technical solutions as follows:

The present disclosure provides a liquid crystal display panel, including:

A first substrate.

A second substrate is aligned with the first substrate to form a cell.

Furthermore, first cutting guide slots are formed on a first transparent base of the first substrate. The first cutting guide slots at least cover one cutting line corresponding to a notch shaped cutting region. Depths of the first cutting guide slots are less than a thickness of the first transparent base.

In the liquid crystal display panel provided by an embodiment of the present disclosure, second cutting guide slots are formed on a second transparent base of the second substrate. The second cutting guide slots at least cover one cutting line corresponding to the notch shaped cutting region. Depths of the second cutting guide slots are less than a thickness of the second transparent base.

In the liquid crystal display panel provided by an embodiment of the present disclosure, a material of the first transparent base includes glass.

In the liquid crystal display panel provided by an embodiment of the present disclosure, a shape of the first cutting guide slots is at least one of an arc, a straight line, a rectangular shape, or a circular shape.

In the liquid crystal display panel provided by an embodiment of the present disclosure, widths of the first cutting guide slots on different positions are same.

In the liquid crystal display panel provided by an embodiment of the present disclosure, a range of the widths of the first cutting guide slots is from 100 μm to 200 μm.

In the liquid crystal display panel provided by an embodiment of the present disclosure, depths of the first cutting guide slots on different positions are same.

In the liquid crystal display panel provided by an embodiment of the present disclosure, the depths of the first cutting guide slots are one-fifth to two-third of a thickness of the first transparent base.

In the liquid crystal display panel provided by an embodiment of the present disclosure, a range of the depths of the first cutting guide slots is from 0.1 mm to 0.15 mm.

In the liquid crystal display panel provided by an embodiment of the present disclosure, the first cutting guide slots are formed on a surface of the first transparent base where a first function film layer is not disposed, and the second cutting guide slots are formed on a surface of the second transparent base where a second function film layer is not disposed.

In the liquid crystal display panel provided by an embodiment of the present disclosure, the first cutting guide slots are formed on a surface of the first transparent base where a first function film layer is disposed, and the second cutting guide slots are formed on a surface of the second transparent base where a second function film layer is not disposed.

In the liquid crystal display panel provided by an embodiment of the present disclosure, the first cutting guide slots are formed on a surface of the first transparent base where a first function film layer is not disposed, and the second cutting guide slots are formed on a surface of the second transparent base where a second function film layer is disposed.

In the liquid crystal display panel provided by an embodiment of the present disclosure, the first cutting guide slots are formed on a surface of the first transparent base where a first function film layer is disposed, and the second cutting guide slots are formed on a surface of the second transparent base where a second function film layer is disposed.

Meanwhile, the present disclosure provides a manufacturing method of a display module, including:

Providing a liquid crystal display panel. The display panel includes a first substrate and a second substrate aligned with the first substrate to form a cell. Furthermore, first cutting guide slots are formed on a first transparent base of the first substrate, and the first cutting guide slots at least cover one cutting line corresponding to a notch shaped cutting region, and depths of the first cutting guide slots are less than a thickness of the first transparent base.

Attaching polarizers on a top surface and a bottom surface of the liquid crystal display panel respectively.

Performing laser cutting on the polarizers and the liquid crystal display panel to from a notch display module.

In the manufacturing method of the display module provided by an embodiment of the present disclosure, providing the liquid crystal display panels includes:

Manufacturing a first substrate master plate, and the plurality of first substrates are formed on the first substrate master plate.

Using a laser cutting machine to engrave to form the first cutting guide slots on a surface of the first transparent base of each of the first substrates where a first function film layer is not disposed, and the first substrate master plate after a cutting process is obtained.

Manufacturing a second substrate master plate, and the plurality of second substrates are formed on the second substrate master plate.

Using a laser cutting machine to engrave to form the second cutting guide slots on a surface of the second transparent base of each of the second substrates where a second function film layer is not disposed, and the second cutting guide slots at least cover one cutting line corresponding to the notch shaped cutting region, and the second substrate master plate is obtained after a cutting process.

Cell aligning the first substrate master plate after the cutting process and the second substrate master plate after the cutting process to form a liquid crystal display panel master plate.

Performing a cutting process on the liquid crystal display panel master plate to form the plurality of liquid crystal display panels.

In the manufacturing method of the display module provided by an embodiment of the present disclosure, providing the liquid crystal display panels includes:

Manufacturing a first substrate master plate, and the plurality of first substrates are formed on the first substrate master plate.

Using a laser cutting machine to engrave to form the first cutting guide slots on a surface of the first transparent base of each of the first substrates where a first function film layer is not disposed, and the first substrate master plate is obtained after a cutting process.

Manufacturing a second substrate master plate, and the plurality of second substrates are formed on the second substrate master plate.

Cell aligning the first substrate master plate after the cutting process and the second substrate master plate to form a liquid crystal display panel master plate.

Using the laser cutting machine to engrave to form second cutting guide slots on a surface of the second transparent base of each of the second substrates where a second function film layer is not disposed, and the second cutting guide slots at least cover one cutting line corresponding to the notch shaped cutting region, and the liquid crystal display panel master plate is obtained after a cutting process.

Performing a cutting process on the liquid crystal display panel master plate after the cutting process to form the plurality of liquid crystal display panels.

In the manufacturing method of the display module provided by an embodiment of the present disclosure, providing the liquid crystal display panels includes:

Manufacturing a first substrate master plate, and the plurality of first substrates are formed on the first substrate master plate.

Manufacturing a second substrate master plate, and the plurality of second substrates are formed on the second substrate master plate.

Cell aligning the first substrate master plate and the second substrate master plate to form a liquid crystal display panel master plate.

Using a laser cutting machine to engrave to form the first cutting guide slots on a surface of the first transparent base of each of the first substrates where a first function film layer is not disposed.

Using the laser cutting machine to engrave to form second cutting guide slots on a surface of the second transparent base of each of the second substrates where a second function film layer is not disposed, and the second cutting guide slots at least cover one cutting line corresponding to the notch shaped cutting region, and the second substrate master plate is obtained after a cutting process.

Performing a cutting process on the liquid crystal display panel master plate to form the plurality of liquid crystal display panels.

In the manufacturing method of the display module provided by an embodiment of the present disclosure, providing the liquid crystal display panels includes:

Manufacturing a first substrate master plate, and the plurality of first substrates are formed on the first substrate master plate.

Manufacturing a second substrate master plate, and the plurality of second substrates are formed on the second substrate master plate.

Using a laser cutting machine to engrave to form second cutting guide slots on a surface of the second transparent base of each of the second substrates where a second function film layer is not disposed, and the second cutting guide slots at least cover one cutting line corresponding to the notch shaped cutting region, and the second substrate master plate is obtained after a cutting process.

Cell aligning the first substrate master plate and the second substrate master plate after the cutting process to form a liquid crystal display panel master plate.

Using the laser cutting machine to engrave to form the first cutting guide slots on a surface of the first transparent base of each of the first substrates where a first function film layer is not disposed to obtain the liquid crystal display panel master plate after a cutting process.

Performing a cutting process on the liquid crystal display panel master plate to form the plurality of liquid crystal display panels.

In the manufacturing method of the display module provided by an embodiment of the present disclosure, providing the liquid crystal display panels includes:

Manufacturing a first substrate master plate, and the plurality of first substrates are formed on the first substrate master plate.

Manufacturing a second substrate master plate, and the plurality of second substrates are formed on the second substrate master plate.

Cell aligning the first substrate master plate and the second substrate master plate to form a liquid crystal display panel master plate.

Performing a cutting process on the liquid crystal display panel master plate to form a plurality of middle liquid crystal display panels.

Using a laser cutting machine to engrave to form the first cutting guide slots on a surface of the first transparent base of each of the middle liquid crystal display panels where a first function film layer is not disposed.

Using the laser cutting machine to engrave to form the second cutting guide slots on a surface of the second transparent base of each of the middle liquid crystal display panels where a second function film layer is not disposed, and the second cutting guide slots at least cover one cutting line corresponding to the notch shaped cutting region, and the plurality of the liquid crystal display panels are obtained.

In the manufacturing method of the display module provided by an embodiment of the present disclosure, providing the liquid crystal display panels includes:

Manufacturing a first substrate master plate, and the plurality of first substrates are formed on the first substrate master plate.

Using a laser cutting machine to engrave to form the first cutting guide slots on a surface of the first transparent base of each of the first substrates where a first function film layer is not disposed, and the first substrate master plate is obtained after a cutting process.

Manufacturing a second substrate master plate, and the plurality of second substrates are formed on the second substrate master plate.

Cell aligning the first substrate master plate after the cutting process and the second substrate master plate to form a liquid crystal display panel master plate.

Performing a cutting process on the liquid crystal display panel master plate to form a plurality of middle liquid crystal display panels.

Using the laser cutting machine to engrave to form the second cutting guide slots on a surface of the second transparent base of each of the middle liquid crystal display panels where a second function film layer is not disposed, and the second cutting guide slots at least cover one cutting line corresponding to the notch shaped cutting region, and the plurality of the liquid crystal display panels are obtained.

Beneficial Effects: The present disclosure provides a liquid crystal display panel and a manufacturing method of a display module. The liquid crystal display panel includes a first substrate and a second substrate aligned with the first substrate to form a cell. Furthermore, cutting guide slots are formed on a first transparent base of the first substrate, and the cutting guide slots at least cover one cutting line corresponding to a notch shaped cutting region, and depths of the cutting guide slots are less than a thickness of the transparent base.

Based on the liquid crystal display panel, the cutting guide slots are formed on the transparent base, and the depths of the cutting guide slots are less than the thickness of the transparent base, which does not affect the normal attachment of polarizers. Meanwhile, the cutting guide slots at least cover one cutting line corresponding to a notch shaped cutting region, so that after the polarizers are attached to the liquid crystal display panel, when using a laser cutting machine to cut the polarizers and the liquid crystal display panel simultaneously, due to the presence of the cutting guide slots, strong laser energy is not required to finish the cutting of the display panel, which eases or even prevents occurrence of cutting cracks, thereby relieving the technical problem of cracks caused due to laser energy being unable to effectively concentrate in the present cutting technology of notch screens, and improving cutting yield.

DESCRIPTION OF DRAWINGS

To more clearly illustrate embodiments or the technical solutions of the present disclosure, the accompanying figures of the present disclosure required for illustrating embodiments or the technical solutions of the present disclosure will be described in brief. Obviously, the accompanying figures described below are only part of the embodiments of the present disclosure, from which those skilled in the art can derive further drawings without making any inventive efforts.

DETAILED DESCRIPTION OF PREFERRED EMBODIMENTS

The descriptions of embodiments below refer to accompanying drawings in order to illustrate certain embodiments which the present disclosure can implement. The directional terms of which the present disclosure mentions, for example, "top", "bottom", "upper", "lower", "front", "rear", "left", "right", "inside", "outside", "side", etc., only refer to directions of the accompanying figures. Therefore, the used directional terms are for illustrating and understanding the present disclosure, but not for limiting the present disclosure. In the figures, units with similar structures are indicated by the same reference numerals.

The present disclosure is aimed at the technical problem of cracks caused due to laser energy being unable to effectively concentrate in the present cutting technology of notch screens, and embodiments of the present disclosure can improve it.

Figure 1:
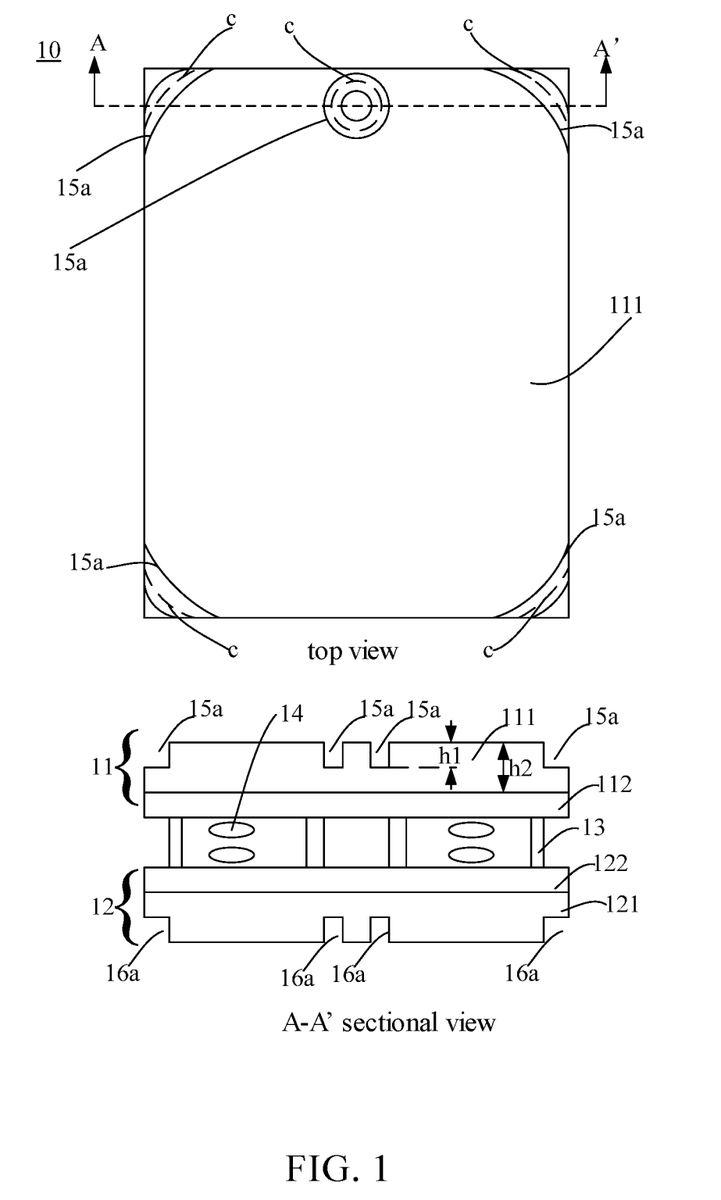
FIG. 1 is a first schematic diagram of a display panel provided by an embodiment of the present disclosure.
Figure 2:
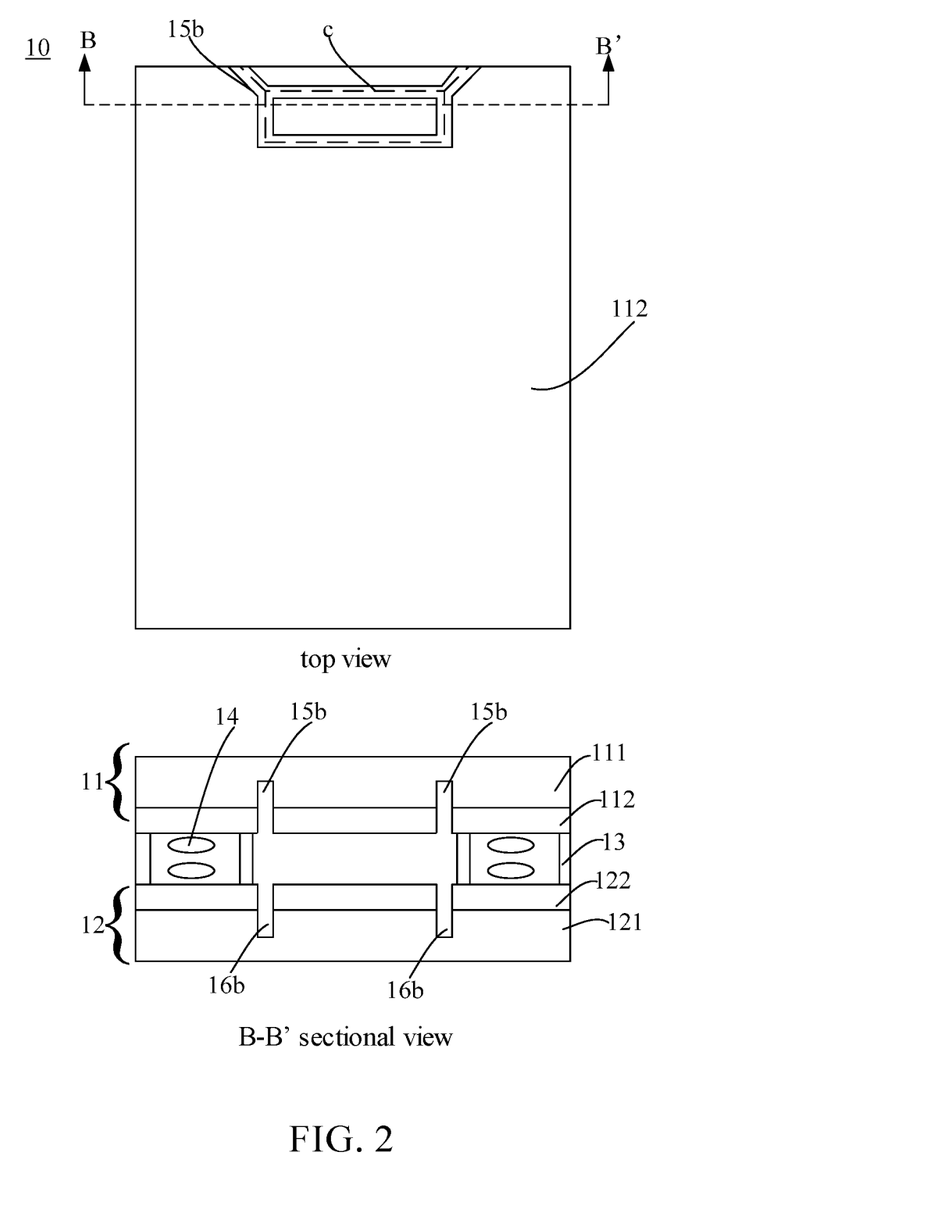
FIG. 2 is a second schematic diagram of a display panel provided by an embodiment of the present disclosure.

As illustrated in FIG. 1 and FIG. 2, a liquid crystal display panel 10 provided by an embodiment of the present disclosure includes:

a first substrate 11;

a second substrate 12, which is aligned with the first substrate 11 to form a cell;

a sealant 13, which forms a liquid crystal filling space; and liquid crystals 14, which fill the liquid crystal filling space.

Furthermore, first cutting guide slots 15 are formed on a first transparent base 111 of the first substrate 11 (including 15a in FIGS. 1 and 15b in FIG. 2). The first cutting guide slots 15 at least cover one cutting line c corresponding to a notch shaped cutting region. Depths h1 of the first cutting guide slots 15 are less than a thickness h2 of the first transparent base 111.

This embodiment provides a liquid crystal display panel. Based on the liquid crystal display panel, the cutting guide slots are formed on the transparent base, and depths of the cutting guide slots are less than a thickness of the transparent base, which does not affect the normal attachment of polarizers. Meanwhile, the cutting guide slots at least cover one cutting line corresponding to a notch shaped cutting region, so that after the polarizers are attached to the liquid crystal display panel, when using a laser cutting machine to cut the polarizers and the liquid crystal display panel simultaneously, due to the presence of the cutting guide slots, strong laser energy is not required to finish the cutting of the display panel, which eases or even prevents occurrence of cutting cracks, thereby relieving technical problem of cracks caused due to laser energy being unable to effectively concentrate in the present cutting technology of notch screens, and improving cutting yield.

As illustrated in FIG. 1 or FIG. 2, in an embodiment, second cutting guide slots 16 are formed on a second transparent base 121 of the second substrate 12 (including 16a in FIGS. 1 and 16b in FIG. 2), and the second cutting guide slots 16 at least cover one cutting line c corresponding to the notch shaped cutting region, and depths of the second cutting guide slots are less than a thickness of the second transparent base.

In an embodiment, shapes, widths, depths, or forming manners and forming positions of the second cutting guide slots 16 on the second substrate 12 and the first cutting guide slots 15 can be same or different. The following takes the shapes, the widths, the depths, the forming manners, and the forming positions of the second cutting guide slots 16 and the first cutting guide slots 15 being same for an example to perform a description. A different scene in which at least one of the shapes, the widths, the depths, the forming manners, or the forming positions of the second cutting guide slots 16 on the second substrate 12 and the first cutting guide slots 15 can be configured according to requirements. For example, if a number of the cutting line c is plural, it can be configured to be that the first cutting guide slots cover part of the cutting lines c corresponding to the notch shaped cutting region, and the second cutting guide slots are covered on the residual part of the cutting lines c corresponding to the notch shaped cutting region.

In an embodiment, material of the first transparent base 111 or the second transparent base 121 includes transparent hard material such as glass.

In an embodiment, the first substrate is an array substrate, and the second substrate is a color film substrate.

In an embodiment, the first substrate is a color film substrate, and the second substrate is an array substrate.

In an embodiment, the first substrate is a substrate disposed with a color film layer (a COA substrate), and the second substrate is a color film substrate only disposed with a black matrix layer.

In an embodiment, the first substrate is a color film substrate only disposed with a black matrix layer, and the second substrate is a substrate disposed with a color film layer (a COA substrate).

As illustrated in FIG. 1 or FIG. 2, in an embodiment, a shape of the first cutting guide slots is at least one of an arc, a straight line, a rectangular shape, or a circular shape.

The notch screen can be various, so that the corresponding cutting line can be at least one of an arc, a straight line, a rectangular shape, or a circular shape. As same, the cutting guide slots is necessary to cover on the cutting line, which has the shape of at least one of an arc, a straight line, a rectangular shape, or a circular shape.

In an embodiment, as illustrated in FIG. 1, the liquid crystal display panel has a round corner screen and a under screen camera. The cutting lines c include four arc cutting lines located at vertex angles and one circular cutting line located on an edge position of the display panel. The circular cutting line is used for making a via hole be formed on the liquid crystal display panel, and electronic elements such as a camera are disposed under the via hole. At this time, the first cutting guide slots 15 (15a) is in a circular arc shape on positions of the vertex angles and is a circular shape on the edge position of the display panel.

In an embodiment, as illustrated in FIG. 2, the liquid crystal display panel is a notch screen. The cutting lines c include a rectangular cutting line located on a top position of the display panel and a straight cutting line connected to the rectangular cutting line. At this time, the first cutting guide slots 15 (15b) include a rectangular shape and two straight lines.

In an embodiment, as illustrated in FIG. 1, the first cutting guide slots 15 (15a) is formed on a surface of the first transparent base 111 where a first function film layer 112 is not disposed, and the second cutting guide slots 16 (16a) are formed on a surface of the second transparent base 121 where a second function film layer 122 is not disposed, and the forming methods of which can be a laser engraving method, a laser etching method, etc.

In an embodiment, as illustrated in FIG. 2, the first cutting guide slots 15 (15b) are formed on a surface of the first transparent base 111 where a first function film layer 112 is disposed, and the second cutting guide slots 16 (16b) are formed on a surface of the second transparent base 121 where a second function film layer 122 is disposed, and the forming methods of which can be a laser engraving method, a laser etching method, etc.

In an embodiment, the first cutting guide slots 15 are formed on a surface of the first transparent base 111 where a first function film layer is not disposed, and the second cutting guide slots 16 are formed on a surface of the second transparent base 121 where a second function film layer is disposed, and the forming methods of which can be a laser engraving method, a laser etching method, etc.

In an embodiment, the first cutting guide slots 15 are formed on a surface of the first transparent base 111 where a first function film layer is disposed, and the second cutting guide slots 16 are formed on a surface of the second transparent base 121 where a second function film layer is not disposed, and the forming methods of which can be a laser engraving method, a laser etching method, etc.

In an embodiment, widths of the first cutting guide slots 15 on different positions may be different. At this time, a range of the widths of the first cutting guide slots means a range of a minimum width and a maximum width, which ranges from 100 μm to 200 μm.

In an embodiment, widths of the first cutting guide slots 15 on different positions may same. At this time, a range of the widths of the first cutting guide slots is from 100 μm to 200 μm.

In an embodiment, depths of the first cutting guide slots 15 on different positions may be same, which are h1 illustrated in FIG. 1 or FIG. 2.

In an embodiment, a configuration method of the depth h1 can be configured corresponding to the transparent base, for example, the depths of the first cutting guide slots are one-fifth to two-third of a thickness of the first transparent base.

In an embodiment, a configuration method of the depth h1 can be configured in a value range, for example, a range of the depths of the first cutting guide slots is from 0.1 mm to 0.15 mm.

In an embodiment, the depths of the first cutting guide slots 15 on different positions may be different. The depths h1 illustrated in FIG. 1 or FIG. 2 is the max depth of the first cutting guide slots 15. At this time, a range of the depths of the first cutting guide slots means a range of a minimum depth and a max depth, which ranges from 0.1 mm to 0.15 mm.

Figure 3:
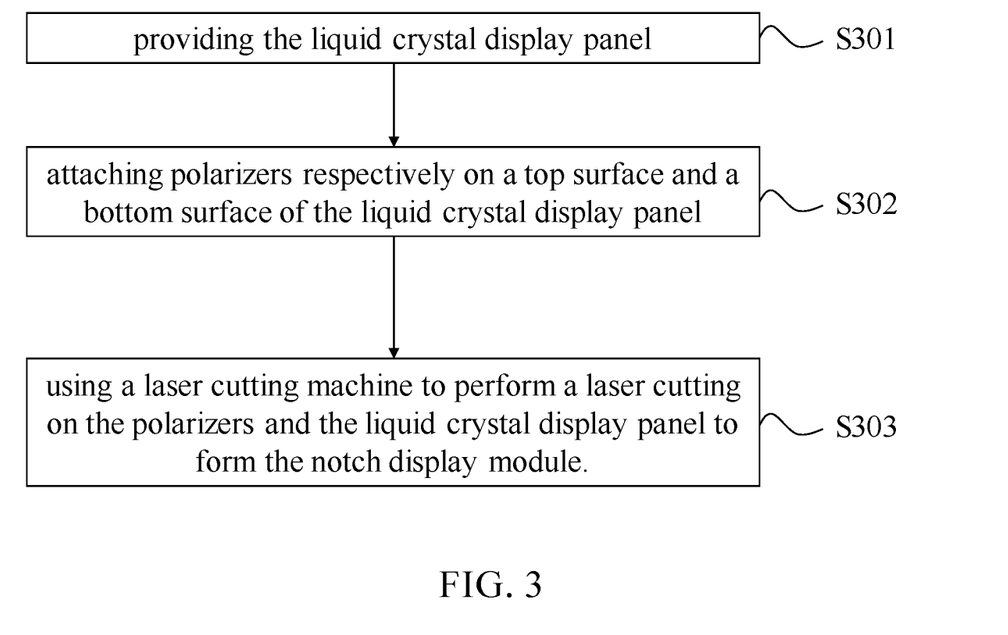
FIG. 3 is a schematic diagram of a manufacturing method of a display module provided by an embodiment of the present disclosure.
Figure 4:
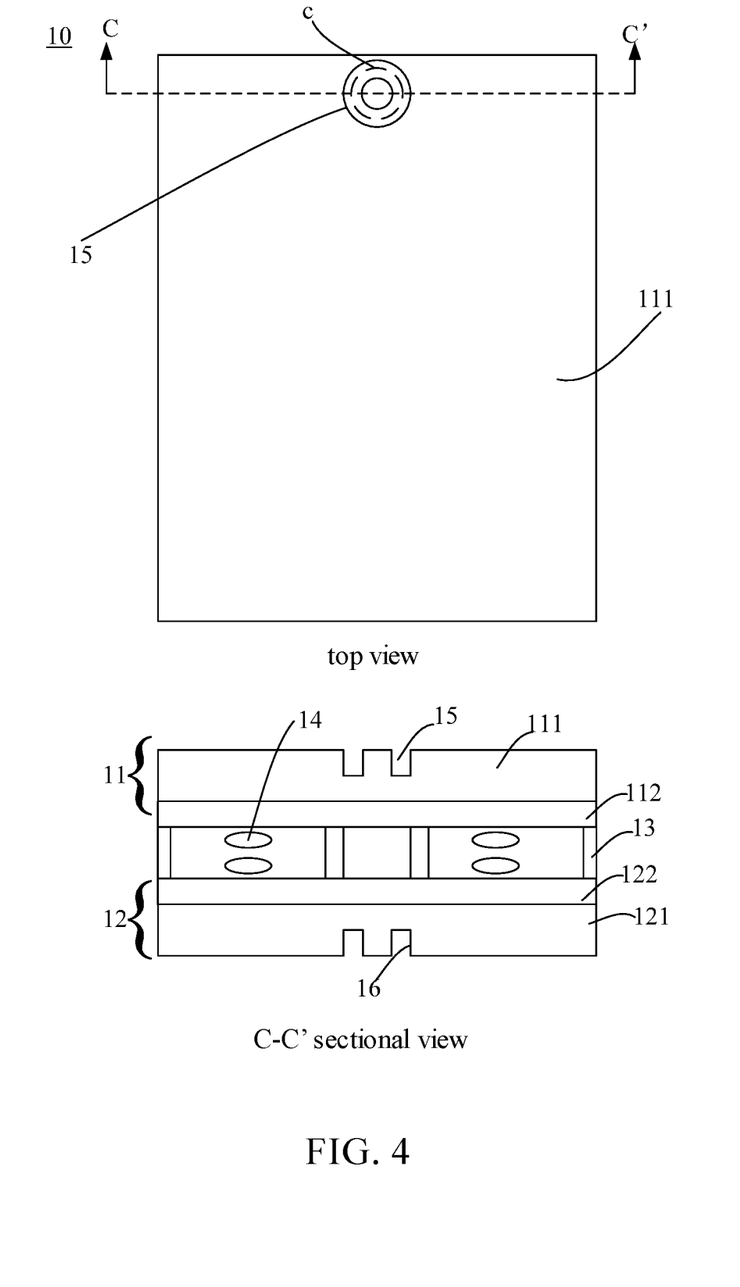
FIG. 4 to FIG. 6 are schematic diagrams of manufacturing processes of a display module provided by an embodiment of the present disclosure.

Meanwhile, the present disclosure provides a manufacturing method of a display module, as illustrated in FIG. 3, the method includes the following steps:

S301: providing a liquid crystal display panel as illustrated in FIG. 4.

The liquid crystal display panel illustrated in FIG. 4 is only required to cut one via hole to realize an under screen camera.

In an embodiment, the under screen camera is used for realizing functions such as gesture tracing recognition, facial recognition, facial vascular network recognition, etc.

In an embodiment, the liquid crystal display panel provided by the steps includes a first substrate and a second substrate aligned with the first substrate to form a cell. Furthermore, first cutting guide slots are formed on a first transparent base of the first substrate. The first cutting guide slots at least cover one cutting line corresponding to a notch shaped cutting region. Depths of the first cutting guide slots are less than a thickness of the first transparent base.

In an embodiment, second cutting guide slots are formed on a second transparent base of the liquid crystal display panel provided by this steps, and the second cutting guide slots at least cover one cutting line corresponding to the notch shaped cutting region, and depths of the second cutting guide slots are less than a thickness of the second transparent base.

The liquid crystal display panel illustrated in FIG. 4 may be the liquid crystal display panel illustrated in FIG. 1, and may also be the liquid crystal display panel illustrated in FIG. 2.

In an embodiment, when the liquid crystal display panel illustrated in FIG. 4 is the liquid crystal display panel illustrated in FIG. 1, the step S301 can include the following steps sequentially:

Manufacturing a first substrate master plate, and the plurality of first substrates are formed on the first substrate master plate.

Using a laser cutting machine to engrave to form the first cutting guide slots on a surface of the first transparent base of each of the first substrates where a first function film layer is not disposed, and the first substrate master plate is obtained after a cutting process.

Manufacturing a second substrate master plate, the plurality of second substrates are formed on the second substrate master plate.

Using a laser cutting machine to engrave to form the second cutting guide slots on a surface of the second transparent base of each of the second substrates where a second function film layer is not disposed, and the second cutting guide slots at least cover one cutting line corresponding to the notch shaped cutting region, and the second substrate master plate is obtained after a cutting process.

Cell aligning the first substrate master plate after the cutting process and the second substrate master plate after the cutting process to form a liquid crystal display panel master plate.

Using a laser cutting method or a mechanical cutting method to perform a cutting process on the liquid crystal display panel master plate to form the plurality of liquid crystal display panels as illustrated in FIG. 1.

In an embodiment, when the liquid crystal display panel illustrated in FIG. 4 is the liquid crystal display panel illustrated in FIG. 1, the step S301 can include the following steps sequentially:

Manufacturing a first substrate master plate, and the plurality of first substrates are formed on the first substrate master plate.

Using a laser cutting machine to engrave to form the first cutting guide slots on a surface of the first transparent base of each of the first substrates where a first function film layer is not disposed, and the first substrate master plate is obtained after a cutting process.

Manufacturing a second substrate master plate, and the plurality of second substrates are formed on the second substrate master plate.

Cell aligning the first substrate master plate after the cutting process and the second substrate master plate to form a liquid crystal display panel master plate.

Using the laser cutting machine to engrave to form the second cutting guide slots on a surface of the second transparent base of each of the second substrates where a second function film layer is not disposed, and the second cutting guide slots at least cover one cutting line corresponding to the notch shaped cutting region, and the liquid crystal display panel master plate is obtained after a cutting process.

Using the laser cutting method or a mechanical cutting method to perform a cutting process on the liquid crystal display panel master plate after the cutting process to form the plurality of liquid crystal display panels as illustrated in FIG. 1.

In an embodiment, when the liquid crystal display panel illustrated in FIG. 4 is the liquid crystal display panel illustrated in FIG. 1, the step S301 can include the following steps sequentially:

Manufacturing a first substrate master plate, and the plurality of first substrates are formed on the first substrate master plate.

Manufacturing a second substrate master plate, and the plurality of second substrates are formed on the second substrate master plate.

Cell aligning the first substrate master plate and the second substrate master plate to form a liquid crystal display panel master plate.

Using a laser cutting machine to engrave to form the first cutting guide slots on a surface of the first transparent base of each of the first substrates where a first function film layer is not disposed.

Using the laser cutting machine to engrave to form the second cutting guide slots on a surface of the second transparent base of each of the second substrates where a second function film layer is not disposed, and the second cutting guide slots at least cover one cutting line corresponding to the notch shaped cutting region, and the second substrate master plate is obtained after a cutting process.

Using a laser cutting method or a mechanical cutting method to perform a cutting process on the liquid crystal display panel master plate after the cutting process to form the plurality of liquid crystal display panels as illustrated in FIG. 1.

In an embodiment, when the liquid crystal display panel illustrated in FIG. 4 is the liquid crystal display panel illustrated in FIG. 1, the step S301 can include the following steps sequentially:

Manufacturing a first substrate master plate, and the plurality of first substrates are formed on the first substrate master plate.

Manufacturing a second substrate master plate, and the plurality of second substrates are formed on the second substrate master plate.

Using a laser cutting machine to engrave to form the second cutting guide slots on a surface of the second transparent base of each of the second substrates where a second function film layer is not disposed, and the second cutting guide slots at least cover one cutting line corresponding to the notch shaped cutting region, and the second substrate master plate is obtained after a cutting process.

Cell aligning the first substrate master plate and the second substrate master plate after the cutting process to form a liquid crystal display panel master plate.

Using a laser cutting machine to engrave to form the first cutting guide slots on a surface of the first transparent base of each of the first substrates where a first function film layer is not disposed to obtain the liquid crystal display panel master plate after a cutting process.

Using a laser cutting method or a mechanical cutting method to perform a cutting process on the liquid crystal display panel master plate after the cutting process to form the plurality of liquid crystal display panels as illustrated in FIG. 1.

In an embodiment, when the liquid crystal display panel illustrated in FIG. 4 is the liquid crystal display panel illustrated in FIG. 1, the step S301 can include the following steps sequentially:

Manufacturing a first substrate master plate, and the plurality of first substrates are formed on the first substrate master plate.

Manufacturing a second substrate master plate, and the plurality of second substrates are formed on the second substrate master plate.

Cell aligning the first substrate master plate and the second substrate master plate to form a liquid crystal display panel master plate.

Using a laser cutting method or a mechanical cutting method to perform a cutting process on the liquid crystal display panel master plate to form a plurality of middle liquid crystal display panels.

Using the laser cutting machine to engrave to form the first cutting guide slots on a surface of the first transparent base of each of the middle liquid crystal display panels where a first function film layer is not disposed.

Using the laser cutting machine to engrave to form the second cutting guide slots on a surface of the second transparent base of each of the middle liquid crystal display panels where a second function film layer is not disposed, the second cutting guide slots at least cover one cutting line corresponding to the notch shaped cutting region, and the plurality of the liquid crystal display panels as illustrated in FIG. 1 are obtained.

In an embodiment, when the liquid crystal display panel illustrated in FIG. 4 is the liquid crystal display panel illustrated in FIG. 1, the step S301 can include the following steps sequentially:

Manufacturing a first substrate master plate, and the plurality of first substrates are formed on the first substrate master plate.

Using a laser cutting machine to engrave to form the first cutting guide slots on a surface of the first transparent base of each of the first substrates where a first function film layer is not disposed, and the first substrate master plate is obtained after a cutting process.

Manufacturing a second substrate master plate, and the plurality of second substrates are formed on the second substrate master plate.

Cell aligning the first substrate master plate after the cutting process and the second substrate master plate to form a liquid crystal display panel master plate.

Using a laser cutting method or a mechanical cutting method to perform a cutting process on the liquid crystal display panel master plate to form a plurality of middle liquid crystal display panels.

Using a laser cutting machine to engrave to form the second cutting guide slots on a surface of the second transparent base of each of the middle liquid crystal display panels where a second function film layer is not disposed, and the second cutting guide slots at least cover one cutting line corresponding to the notch shaped cutting region, and the plurality of the liquid crystal display panels as illustrated in FIG. 1 are obtained.

In an embodiment, when the liquid crystal display panel illustrated in FIG. 4 is the liquid crystal display panel illustrated in FIG. 1, the step S301 can include the following steps sequentially:

Manufacturing a first substrate master plate, and the plurality of first substrates are formed on the first substrate master plate.

Manufacturing a second substrate master plate, and the plurality of second substrates are formed on the second substrate master plate.

Using a laser cutting machine to engrave to form the second cutting guide slots on a surface of the second transparent base of each of the second substrates where a second function film layer is not disposed, the second cutting guide slots at least cover one cutting line corresponding to the notch shaped cutting region, and the second substrate master plate is obtained after a cutting process.

Cell aligning the first substrate master plate and the second substrate master plate after the cutting process to form a liquid crystal display panel master plate.

Using a laser cutting method or a mechanical cutting method to perform a cutting process on the liquid crystal display panel master plate to form a plurality of middle liquid crystal display panels.

Using a laser cutting machine to engrave to form the first cutting guide slots on a surface of the first transparent base of each of the middle liquid crystal display panels where a first function film layer is not disposed to form the plurality of liquid crystal display panels as illustrated in FIG. 1.

In an embodiment, when the liquid crystal display panel illustrated in FIG. 4 is the liquid crystal display panel illustrated in FIG. 2, the step S301 can include the following steps sequentially:

Manufacturing a first substrate master plate, and the plurality of first substrates are formed on the first substrate master plate.

Using a laser cutting machine to engrave to form the first cutting guide slots on a surface of the first transparent base of each of the first substrates where a first function film layer is disposed, and the first substrate master plate is obtained after a cutting process.

Manufacturing a second substrate master plate, and the plurality of second substrates are formed on the second substrate master plate.

Using a laser cutting machine to engrave to form the second cutting guide slots on a surface of the second transparent base of each of the second substrates where a second function film layer is disposed, and the second cutting guide slots at least cover one cutting line corresponding to the notch shaped cutting region, and the second substrate master plate is obtained after a cutting process.

Cell aligning the first substrate master plate after the cutting process and the second substrate master plate after the cutting process to form a liquid crystal display panel master plate.

Using a laser cutting method or a mechanical cutting method to perform a cutting process on the liquid crystal display panel master plate to form the plurality of liquid crystal display panels as illustrated in FIG. 2.

Figure 5:
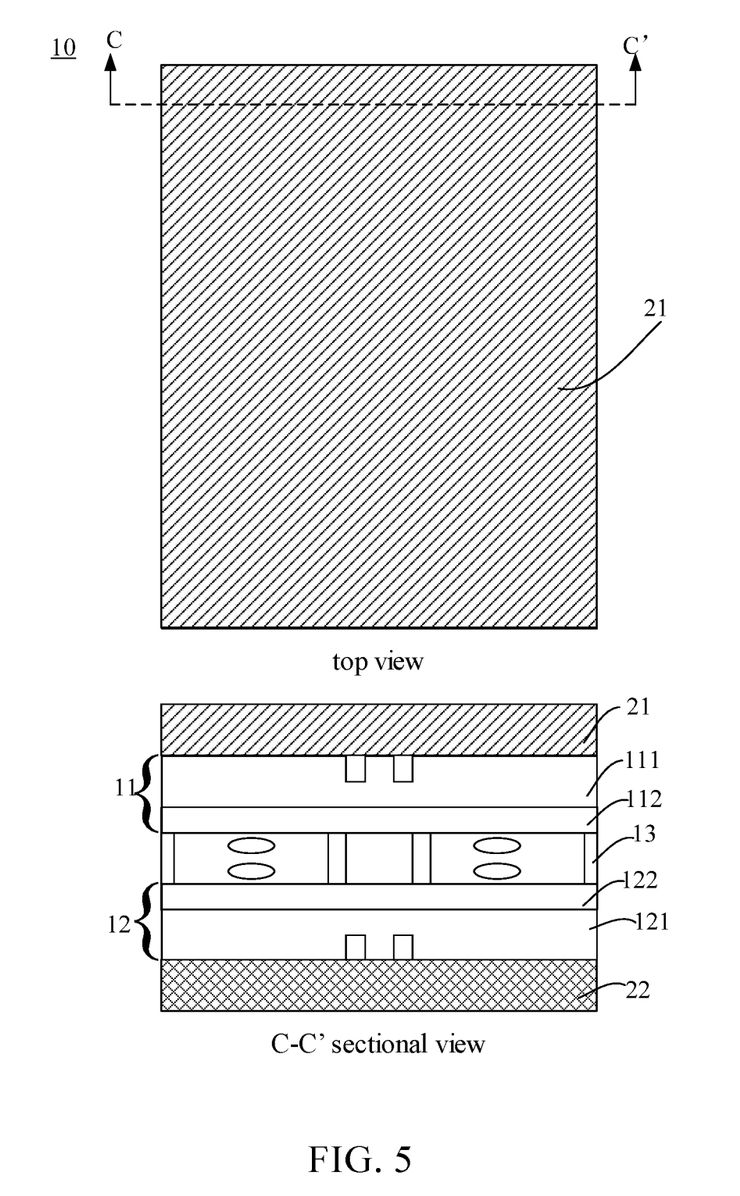

S302: as illustrated in FIG. 5, attaching polarizers respectively on a top surface and a bottom surface of the liquid crystal display panel.

This step includes: attaching a first polarizer 21 on a surface of the first substrate 11, and attaching a second polarizer 22 on the second substrate 12.

Figure 6:
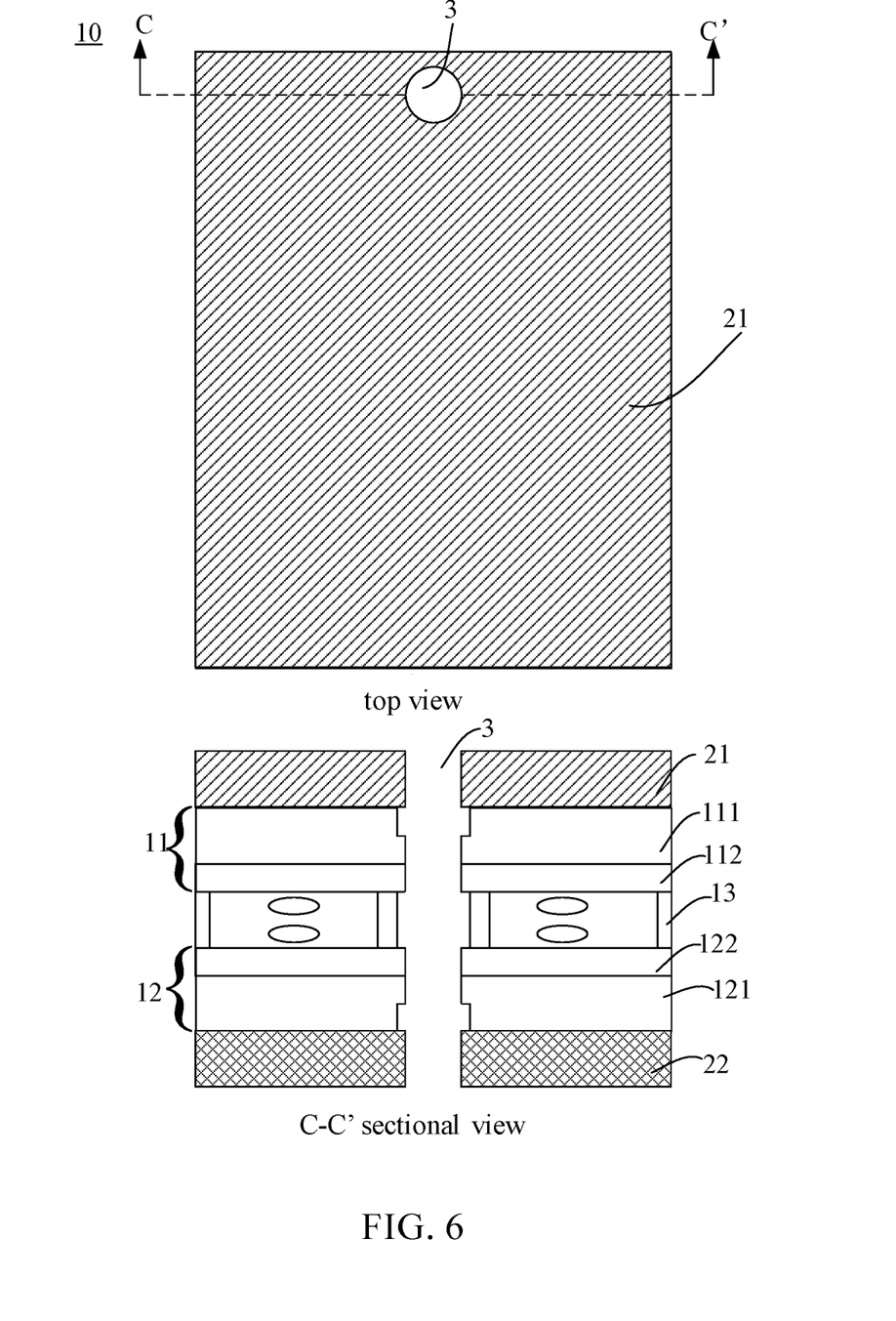

S303: as illustrated in FIG. 6, using a laser cutting machine to perform a laser cutting on the polarizers and the liquid crystal display panel to form the notch display module.

This step includes: using a laser cutting machine to perform the laser cutting on the polarizers and the liquid crystal display panel along the cutting line c in FIG. 4 to form a via hole 3, and at this time, the display module is illustrated as FIG. 6.

According to embodiments mentioned above:

The present disclosure provides a liquid crystal display panel and a manufacturing method of a display module. The liquid crystal display panel includes a first substrate and a second substrate aligned with the first substrate to form a cell. Furthermore, cutting guide slots are formed on a first transparent base of the first substrate, and the cutting guide slots at least cover one cutting line corresponding to a notch shaped cutting region, and depths of the cutting guide slots are less than a thickness of the transparent base. Based on the liquid crystal display panel, the cutting guide slots are formed on the transparent base, and depths of the cutting guide slots are less than a thickness of the transparent base, which does not affect the normal attachment of polarizers. Meanwhile, the cutting guide slots at least cover one cutting line corresponding to a notch shaped cutting region, so that after the polarizers are attached on the liquid crystal display panel, during using a laser cutting machine to cut the polarizers and the liquid crystal display panel simultaneously, due to the presence of the cutting guide slots, strong laser energy is not required to finish the cutting of the display panel, which eases or even prevents occurrence of cutting cracks, thereby relieving the technical problem of cracks caused due to laser energy being unable to effectively concentrate in the present cutting technology of notch screens, and improving cutting yield.

In summary, although the present disclosure has disclosed the preferred embodiments as above, the above-mentioned preferred embodiments are not to limit to the present disclosure. A person skilled in the art can make any changes and modifications, therefore the scope of protection of the present disclosure is subject to the scope defined by the claims.

What is claimed is:

1. A liquid crystal display panel, comprising:
a first substrate; and
a second substrate aligned with the first substrate to form a cell;
wherein first cutting guide slots are formed on a first transparent base of the first substrate, the first cutting guide slots at least cover one cutting line corresponding to a notch shaped cutting region, and depths of the first cutting guide slots are less than a thickness of the first transparent base;
wherein second cutting guide slots are formed on a second transparent base of the second substrate, the second cutting guide slots at least cover one cutting line corresponding to the notch shaped cutting region, and depths of the second cutting guide slots are less than a thickness of the second transparent base; and
wherein the first cutting guide slots are formed on a surface of the first transparent base where a first function film layer is disposed, and the second cutting guide slots are formed on a surface of the second transparent base where a second function film layer is not disposed; or
the first cutting guide slots are formed on a surface of the first transparent base where the first function film layer is not disposed, and the second cutting guide slots are formed on a surface of the second transparent base where the second function film layer is disposed; or
the first cutting guide slots are formed on the surface of the first transparent base where the first function film layer is disposed, and the second cutting guide slots are formed on the surface of the second transparent base where the second function film layer is disposed.

2. The liquid crystal display panel as claimed in claim 1, wherein a material of the first transparent base comprises glass.

3. The liquid crystal display panel as claimed in claim 1, wherein a shape of the first cutting guide slots is at least one of an arc, a straight line, a rectangular shape, or a circular shape.

4. The liquid crystal display panel as claimed in claim 1, wherein widths of the first cutting guide slots on different positions are same.

5. The liquid crystal display panel as claimed in claim 4, wherein a range of the widths of the first cutting guide slots is from 100 μm to 200 μm.

6. The liquid crystal display panel as claimed in claim 1, wherein the depths of the first cutting guide slots on different positions are same.

7. The liquid crystal display panel as claimed in claim 6, wherein the depths of the first cutting guide slots are one-fifth to two-third of the thickness of the first transparent base.

8. The liquid crystal display panel as claimed in claim 6, wherein a range of the depths of the first cutting guide slots is from 0.1 mm to 0.15 mm.

9. A manufacturing method of a display module, comprising:
providing a liquid crystal display panel, wherein the liquid crystal display panel comprises a first substrate and a second substrate aligned with the first substrate to form a cell, wherein first cutting guide slots are formed on a first transparent base of the first substrate, the first cutting guide slots at least cover one cutting line corresponding to a notch shaped cutting region, and depths of the first cutting guide slots are less than a thickness of the first transparent base;
attaching polarizers on a top surface and a bottom surface of the liquid crystal display panel, respectively; and
performing laser cutting on the polarizers and the liquid crystal display panel to from a notch display module;
wherein providing the liquid crystal display panel comprises:
manufacturing a first substrate master plate, wherein a plurality of the first substrates are formed on the first substrate master plate; using a laser cutting machine to engrave to form the first cutting guide slots on a surface of the first transparent base of each of the first substrates where a first function film layer is not disposed, and the first substrate master plate is obtained after a cutting process; manufacturing a second substrate master plate, wherein a plurality of the second substrates are formed on the second substrate master plate; using the laser cutting machine to engrave to form second cutting guide slots on a surface of the second transparent base of each of the second substrates where a second function film layer is not disposed, the second cutting guide slots at least cover one cutting line corresponding to the notch shaped cutting region, and the second substrate master plate is obtained after the cutting process; cell aligning the first substrate master plate after the cutting process and the second substrate master plate after the cutting process to form a liquid crystal display panel master plate; and performing a cutting process on the liquid crystal display panel master plate to form a plurality of the liquid crystal display panels; or
manufacturing the first substrate master plate, wherein a plurality of the first substrates are formed on the first substrate master plate; using the laser cutting machine to engrave to form the first cutting guide slots on the surface of the first transparent base of each of the first substrates where the first function film layer is not disposed, and the first substrate master plate is obtained after the cutting process; manufacturing the second substrate master plate, wherein a plurality of the second substrates are formed on the second substrate master plate; cell aligning the first substrate master plate after the cutting process and the second substrate master plate to form the liquid crystal display panel master plate; using the laser cutting machine to engrave to form the second cutting guide slots on the surface of the second transparent base of each of the second substrates where the second function film layer is not disposed, the second cutting guide slots at least cover one cutting line corresponding to the notch shaped cutting region, and the liquid crystal display panel master plate is obtained after the cutting process; and performing the cutting process on the liquid crystal display panel master plate after the cutting process to form a plurality of the liquid crystal display panels; or manufacturing the first substrate master plate, wherein a plurality of the first substrates are formed on the first substrate master plate; manufacturing the second substrate master plate, wherein a plurality of the second substrates are formed on the second substrate master plate; cell aligning the first substrate master plate and the second substrate master plate to form the liquid crystal display panel master plate; using the laser cutting machine to engrave to form the first cutting guide slots on the surface of the first transparent base of each of the first substrates where the first function film layer is not disposed; using the laser cutting machine to engrave to form the second cutting guide slots on the surface of the second transparent base of each of the second substrates where the second function film layer is not disposed, the second cutting guide slots at least cover one cutting line corresponding to the notch shaped cutting region, and the second substrate master plate is obtained after the cutting process; performing the cutting process on the liquid crystal display panel master plate to form a plurality of the liquid crystal display panels; or manufacturing the first substrate master plate, wherein a plurality of the first substrates are formed on the first substrate master plate; manufacturing the second substrate master plate, wherein a plurality of the second substrates are formed on the second substrate master plate; using the laser cutting machine to engrave to form the second cutting guide slots on the surface of the second transparent base of each of the second substrates where the second function film layer is not disposed, the second cutting guide slots at least cover one cutting line corresponding to the notch shaped cutting region, and the second substrate master plate is obtained after the cutting process; cell aligning the first substrate master plate and the second substrate master plate after the cutting process to form the liquid crystal display panel master plate; using the laser cutting machine to engrave to form the first cutting guide slots on the surface of the first transparent base of each of the first substrates where the first function film layer is not disposed to obtain the liquid crystal display panel master plate after the cutting process; and performing the cutting process on the liquid crystal display panel master plate after the cutting process to form a plurality of the liquid crystal display panels; or manufacturing the first substrate master plate, wherein a plurality of the first substrates are formed on the first substrate master plate; manufacturing the second substrate master plate, wherein a plurality of the second substrates are formed on the second substrate master plate; cell aligning the first substrate master plate and the second substrate master plate to form the liquid crystal display panel master plate; performing the cutting process on the liquid crystal display panel master plate to form a plurality of middle liquid crystal display panels; using the laser cutting machine to engrave to form the first cutting guide slots on the surface of the first transparent base of each of the middle liquid crystal display panels where the first function film layer is not disposed; using the laser cutting machine to engrave to form the second cutting guide slots on the surface of the second transparent base of each of the middle liquid crystal display panels where the second function film layer is not disposed, the second cutting guide slots at least cover one cutting line corresponding to the notch shaped cutting region, and a plurality of the liquid crystal display panels are obtained; or manufacturing the first substrate master plate, wherein a plurality of the first substrates are formed on the first substrate master plate; using the laser cutting machine to engrave to form the first cutting guide slots on the surface of the first transparent base of each of the first substrates where the first function film layer is not disposed, and the first substrate master plate is obtained after the cutting process; manufacturing the second substrate master plate, wherein a plurality of the second substrates are formed on the second substrate master plate; cell aligning the first substrate master plate after the cutting process and the second substrate master plate to form the liquid crystal display panel master plate; performing the cutting process on the liquid crystal display panel master plate to form a plurality of the middle liquid crystal display panels; using the laser cutting machine to engrave to form the second cutting guide slots on the surface of the second transparent base of each of the second substrates where the second function film layer is not disposed, the second cutting guide slots at least cover one cutting line corresponding to the notch shaped cutting region, and a plurality of the liquid crystal display panels are obtained.

* * * * *